United States Patent [19]

Mignen

[11] 4,300,821

[45] Nov. 17, 1981

[54] PHOTOCHROMIC OPHTHALMIC LENS OF ORGANIC MATERIALS

[75] Inventor: Bernard Mignen, Saint Maur, France

[73] Assignee: Essilor International Cie Generale d'Optique, Creteil, France

[21] Appl. No.: 124,906

[22] Filed: Feb. 26, 1980

[30] Foreign Application Priority Data

Feb. 28, 1979 [FR] France ............................. 79 05234

[51] Int. Cl.³ .................. B29D 11/02; G02B 5/23; G02C 7/10
[52] U.S. Cl. .................................... 351/163; 264/1.1; 350/354; 351/177; 425/808
[58] Field of Search ............................. 65/38, DIG. 2; 351/163–166, 177; 350/354; 261/1; 425/808

[56] References Cited

U.S. PATENT DOCUMENTS

| 3,512,869 | 5/1970 | Plumat et al. | 65/DIG. 2 X |
| 3,711,417 | 1/1973 | Schuler | 351/163 X |
| 3,970,362 | 7/1976 | Laliberte | 351/163 X |
| 4,035,527 | 7/1977 | Deeg | 350/354 X |
| 4,168,339 | 9/1979 | Kerko et al. | 351/165 X |
| 4,217,391 | 8/1980 | Kaltz | 350/354 X |

Primary Examiner—John K. Corbin
Assistant Examiner—Scott J. Sugarman
Attorney, Agent, or Firm—Charles E. Brown

[57] ABSTRACT

An ophthalmic lens made of organic material has at least one layer of photochromic mineral glass within its mass to impart photochromic properties to the lens. This layer has a fibrous structure and may comprise a piece of woven fabric produced from fibres of photochromic mineral glass possessing a refractive index and a coefficient of chromatic dispersion which are equal to those of the constituent organic material of the lens.

6 Claims, 9 Drawing Figures

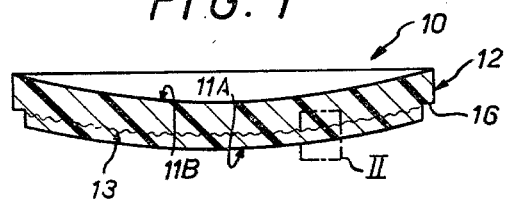
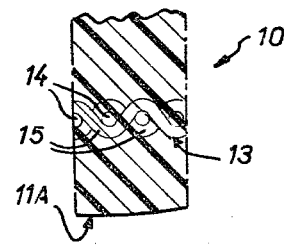
FIG. 1  FIG. 2
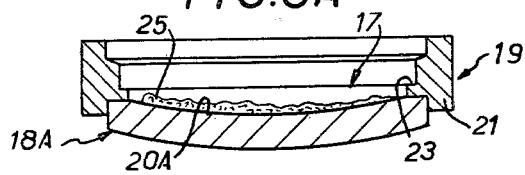
FIG. 3A
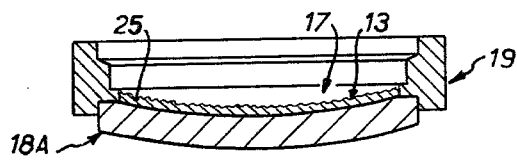
FIG. 3B
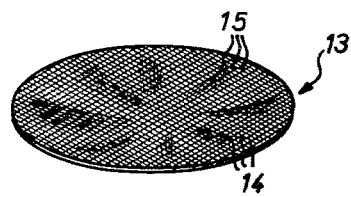
FIG. 4
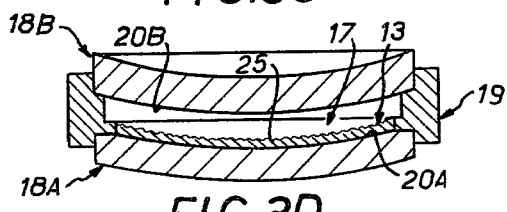
FIG. 3C
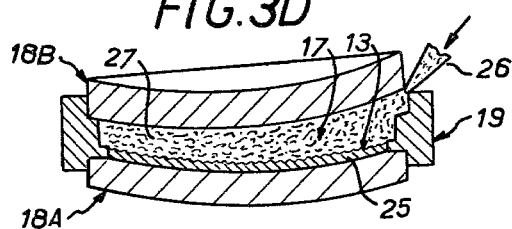
FIG. 3D
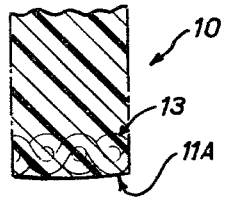
FIG. 5
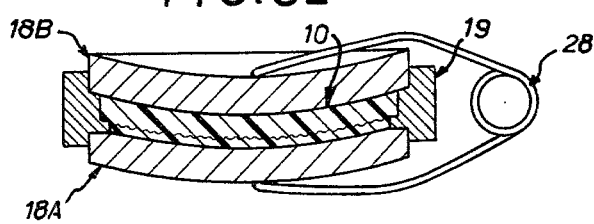
FIG. 3E

PHOTOCHROMIC OPHTHALMIC LENS OF ORGANIC MATERIALS

BACKGROUND OF THE INVENTION

The present invention relates to ophthalmic lenses, and more particularly to ophthalmic lenses which are photochromic, that is, those in which the colouration, or more precisely the absorption spectrum, varies in a reversible manner under the action of radiation, more particularly ultraviolet radiation, which they receive.

As is known, ophthalmic lenses are currently produced either from mineral glass or from organic material.

The organic material which is most commonly used in the latter case is the monomer known under the tradename "CR 39"; this monomer is ethylene glycol diallyl dicarbonate and this is polymerised with the aid of a catalyst, for example isopropyl percarbonate.

Compared with ophthalmic lenses made of mineral glass, opthalmic lenses made from this type of organic material have the advantage of being lighter, other conditions being equal; they have the additional advantage of being unbreakable.

In order to render ophthalmic lenses made of organic material photochromic, two methods are currently envisaged.

The first method, analogous to that which is already proving satisfactory in the case of ophthalmic lenses made of mineral glass, consists in incorporating photochromic pigments into the lenses in question.

However, this solution has not yet proved commercially satisfactory for lenses made of organic material; in fact, after polymerisation of the organic material into which they are incorporated, the photochromic pigments tested hitherto do not retain their photochromic property, in particular because the catalyst required for this polymerisation causes inhibition of the pigments.

Thus, for chemical reasons, this first solution has not in practice led to stable photochromic ophthalmic lenses made of an organic material.

The second method envisaged for rendering an ophthalmic lens, made of an organic material, photochromic consists in embedding a layer of photochromic mineral glass in the bulk of the latter.

The experiments carried out in this direction hitherto have concerned the use of a layer of photochromic mineral glass in the form of a film, that is to say a layer having a massive structure with a well-defined coefficient of expansion which depends on the nature of the mineral glass used.

Again, these experiments have not led to commercially satisfactory results because of possible splitting between the layer of photochromic mineral glass and the mass of organic material in which it is embedded, in particular during the stress release which inevitably occurs when the ophthalmic lenses made in this way are routed, this routing being necessary in order to match the lenses to the spectacle frames in which they are to be mounted. This possible splitting is generally due to the contraction of the organic material in question during its polymerisation, and to the differences in coefficients of expansion between the organic material and the photochromic mineral glass used.

Thus, in this case, it is for mechanical reasons that, hitherto, this second solution has not in practice led to stable photochromic ophthalmic lenses made of organic material.

Therefore, at the present time, commercial photochromic ophthalmic lenses are usually made of mineral glass.

It is an object of the present invention to make it possible to produce photochromic ophthalmic lenses from organic material.

SUMMARY OF THE INVENTION

According to a first aspect of the present invention there is provided an ophthalmic lens made of organic material and comprising at least one layer of photochromic mineral glass within its mass, the or each said layer having a fibrous structure.

Preferably, this layer is a piece of woven fabric produced from fibres of photochromic mineral glass.

However, the layer could also be, for example, a mat, in particular a mat of monofilaments, or other nonwoven structures.

Because of its fibrous structure, the layer of photochromic mineral glass used according to the invention has the advantage of being able to deform in three dimensions; it can stretch and contract in both the directions within its plane and it can bend in a direction perpendicular to its plane.

Because of this capacity for deformation, this layer of photochromic mineral glass is capable of following the contraction of the organic material during it polymerisation, and its differential variations in expansion, without risk of splitting.

A photochromic ophthalmic lens made of organic material, according to the invention, thus possesses a good mechanical stability, even to routing; as the photochromic pigments contained in the lens are embedded in mineral glass, the lens further possesses a good chemical stability.

Moreover, a lens of the invention has the advantage that its impact strength is increased by the layer of fibrous structure which constitutes an internal reinforcement.

The constituent photochromic mineral glass of the fibres in this layer is generally chosen to possess a refractive index which is equal to that of the organic material in which this layer is embedded, for the centre of the visible spectrum, and also to possess a coefficient of chromatic dispersion which is equivalent to that of the said organic material.

Thus, regardless of the wavelength, any inadvertent refraction of the light, as it passes through the organic material/mineral glass refractive interfaces formed on the surface of the fibres used, is avoided, and the fibres are not therefore visible.

The present invention also extends to a process for manufacturing an ophthalmic lens made of organic material and comprising at least one layer of photochromic mineral glass within its mass, comprising the steps of placing a dose of organic material within a mould cavity and placing a layer of photochromic mineral glass having a fibrous structure within the mould cavity, and then causing said organic material to polymerise.

According to a further aspect of the invention, there is provided a mould having a mould cavity for use in a process of manufacturing an ophthalmic lens in which a dose of organic material and at least one layer of photochromic mineral glass having a fibrous structure are placed in the mould cavity and then said organic material is caused to polymerise, the mould comprising two mould shells defining the mould cavity therebetween, an annular gasket interposed between the mould shells at their peripheries, and positioning means within the mould cavity for holding the layer of photochromic mineral glass.

The positioning means preferably form part of any one of the members consisting of the annular gasket and the mould shells.

It will be appreciated that provision of the layer of photochromic mineral glass within the mass of the lens does not complicate the general process for the production of ophthalmic lenses.

BRIEF DESCRIPTION OF THE DRAWINGS

Embodiments of the present invention will hereinafter be described, by way of example, with reference to the accompanying drawings, in which:

FIG. 1 shows an axial section of a photochromic ophthalmic lens of the invention;

FIG. 2 shows on a larger scale the part of the lens within the area II of FIG. 1;

FIGS. 3A, 3B, 3C, 3D and 3E are views, in axial section, illustrating a process for manufacturing a photochromic ophthalmic lens of the invention;

FIG. 4 is a perspective view of a layer of fibrous structure which is used in the manufacturing process; and FIG. 5 is a view analogous to that of FIG. 2 of a further embodiment of a lens of the invention.

DESCRIPTION OF THE PREFERRED EMBODIMENTS

For convenience, the term "ophthalmic lens" is used hereinafter to denote the rough moulding, or disc, obtained at the end of a manufacturing process before any machining and/or edging operations.

Such an ophthalmic lens is designated by the reference 10 in FIG. 1.

The lens 10 comprises a front face 11A, a rear face 11B and a peripheral edge 12.

In the embodiment illustrated, the face 11A is convex and the face 11B is concave, but these arrangements do not of course limit the invention.

As is known, in either or both of the faces 11A, 11B of this ophthalmic lens can be obtained directly by moulding to the desired curvature; the ophthalmic lens 10 in this case constitutes a finished product which subsequently only needs to be edge shaped in order to match it to the spectacle frame in which it is to be mounted.

Alternatively, as is also known, the lens can also constitute a semi-finished product, only one of its faces 11A, 11B, for example its face 11A, being obtained by moulding to the desired curvature. It is then necessary for the other face to be machined to the required curvature.

In both cases, each of the faces can be provided with the curvature required.

The mass of an ophthalmic lens of the invention is made of an organic material, for example suitably polymerised ethylene glycol diallyl dicarbonate.

According to the invention, the lens contains, in its mass, at least one layer 13 of photochromic mineral glass, and this layer 13 has a fibrous structure.

In the embodiment illustrated, only one layer 13 has been provided, and it is only for the convenience of the description that it has been made visible in FIGS. 1 and 2.

In reality, the constituent glass of the fibres of this layer 13 is chosen to possess a refractive index which is equal to that of the constituent organic material of the ophthalmic lens, that is, 1.500 in the case of polyethylene glycol diallyl dicarbonate under consideration, for the centre of the visible spectrum.

The glass of the fibres is also chosen to possess an equivalent coefficient of chromatic dispersion, that is, $$v_d = (n_{d-1})/(n_f - n_c) = 55.5$$

Thus, the eye is not able to discern the presence of the layer 13 in the ophthalmic lens 10.

A preferred embodiment of the layer 13 is shown in isolation in FIG. 4. This layer 13 consists of a piece of woven fabric, having a circular contour, which is produced from fibres of photochromic mineral glass. Thus, in this case, the layer 13 generally comprises weft filaments 14 interlocked with warp filaments 15.

These filaments, or fibres, are simply obtained by spinning a photochromic mineral glass; their diameter can be, for example, between 3 and 15 microns in the case of silicone fibres, that is to say continuous fibres, and 1 to 10 microns in the case of glass fibres, that is to say fibres having a length of between 5 and 80 cm, although these values should in no way be considered as limiting the invention; on the contrary, it may be necessary, for example, to increase the diameter of these filaments of fibres in order to obtain the desired photochromic effect.

The photochromic mineral glasses which can be used are in themselves well known and, as they do not form part of the present invention, they will not be described in greater detail in this text.

For example, suitable photochromic mineral glasses are described, for example, in U.S. Pat. No. 3,208,860 or in French Pat. No. 1,517,795.

Preferably, the layer 13 is closer to the front face 11A of the ophthalmic lens 10 than to the rear face 11B thereof, so that, when reaching the layer, external radiation has retained as much of its energy as possible and can thus have the maximum effect on the photochromic pigments present in the layer.

Furthermore, any agent which is capable of filtering the ultraviolet rays is preferably not incorporated into the organic material used.

In the embodiment illustrated in FIGS. 1 and 2, the layer 13 is at a short distance from the front face 11A of the ophthalmic lens 12; as a variant, in FIG. 5, the layer is in the immediate vicinity of the said front face.

In both cases, the layer 13 substantially conforms to the shape of this front face 11A.

Finally, for reasons which will become apparent below, the ophthalmic lens 10 has a shoulder 16 on its peripheral edge 12. In the embodiment illustrated, the shoulder 16 is at right-angles to the internal layer 13 of the lens.

The ophthalmic lens 10 described above can be manufactured using a mould having a mould cavity 17 defined by two mould shells 18A, 18B and an annular gasket 19 interposed between these mould shells at their periphery as shown in FIGS. 3A to 3E.

The mould shell 18A has a moulding surface 20A having the profile of the front face 11A which is to be obtained for the desired ophthalmic lens 10; thus, in the embodiment illustrated the moulding surface 20A is concave.

Likewise, the mould shell 18B possesses a moulding surface 20B having the profile of the rear face 11B to be obtained for the desired ophthalmic lens 10; thus, in the embodiment illustrated, the moulding surface 20B is convex.

These mould shells 18A, 18B are made, for example, of glass, in particular toughened glass.

The annular gasket 19 is usually made of a synthetic material.

The gasket 19 comprises a skirt 21 into which the mould shells 18A, 18B fit and are thereby centred. An annular rib 22, for supporting the mould shells, projects from the internal face of the skirt 21.

Preferably, positioning means for holding the layer 13 of photochromic mineral glass to be used are also provided in the mould cavity 17.

These positioning means may be formed on the annular gasket 19 or on the mould shells 18A, 18B.

In the embodiment illustrated, the positioning means are formed by an internal shoulder 23 on the rib 22 of the annular gasket 19, close to the mould shell 18A.

In use, the mould shell 18A is placed on a support (not shown) and the annular gasket 19 is engaged on the mould shell 18A. A first portion 25 of the overall dose of organic material to be used is placed in the mould cavity 17 formed in this way, as shown in FIG. 3A.

The layer 13 having a fibrous structure is then placed in the mould cavity 17 and is caused to bear, by its periphery, on the shoulder 23 of the annular gasket 19, as shown in FIG. 3B.

Preferably, this layer 13 is shaped beforehand to match the moulding surface 20A of the mould shell 18A; it is therefore slightly curved in the embodiment shown.

Also preferably, the first portion 25 of the dose of organic material to be used is chosen so that, after the layer 13 has been positioned in the mould cavity 17, the space between this layer 13 and the mould shell 18A is totally filled by this organic material, and so that the layer 13 itself is preferably impregnated by the latter.

The mould shell 18B is then positioned, as shown in FIG. 3C, and, with the aid of an injection nozzle 26 inserted between the said mould shell and the annular gasket 19, as shown in FIG. 3D, a second portion 27 of the dose of organic material to be used is introduced into the mould cavity 17 in such a way as to fill this mould cavity completely.

Of course, an appropriate amount of a catalyst, for example isopropyl percarbonate, has been suitably added to the organic material used.

Elastic tongs 28 are then placed across the mould shells 18A, 18B, on the outside of the mould which the latter form together with the annular gasket 19, as shown in FIG. 3E, and this mould is placed in an apparatus, for example an oven, which is suitable for appropriately carrying out the cycle for the polymerisation of the organic material which it contains.

As these arrangements are in themselves well known, they will now be described in greater detail in this text.

After polymerisation, the ophthalmic lens obtained is released from the mould.

Of course, the present invention is not restricted to the embodiments which have been described and shown, but encompasses any variant.

In particular, if desired, several layers having a fibrous structure, according to the invention, can be used.

Moreover, instead of consisting of a piece of woven fabric, this layer can consist of a mat or of any other nonwoven structure.

Furthermore, the field of application of the invention covers not only unifocal lenses but also, for example, multifocal lenses, or varifocal lenses, and more generally any type of opthalmic lenses.

It is self-evident that the term organic material is understood in this text as meaning any synthetic material, regardless of the thermosetting or thermoplastic properties thereof.

I claim:

1. An ophthalmic lens made of organic material and comprising at least one layer of photochromic mineral glass within its mass, said layer of photochromic mineral glass having a fibrous structure.

2. An ophthalmic lens according to claim 1, wherein the layer of photochromic mineral glass is a piece of woven fabric formed of fibres of photochromic mineral glass possessing a refractive index and a coefficient of chromatic dispersion which are equal to those of the constituent organic material of said lens.

3. An ophthalmic lens according to claim 1 or claim 2, wherein the layer of photochromic mineral glass is closer to the front face of the lens than to the rear face of the latter.

4. An ophthalmic lens according to claim 3, wherein the layer of photochromic mineral glass is in the immediate vicinity of the front face of the lens.

5. A process for manufacturing an ophthalmic lens made of organic material and comprising at least one layer of photochromic mineral glass within its mass, said process comprising the steps of placing a dose of organic material within a mould cavity and placing a layer of photochromic mineral glass having a fibrous structure within the mould cavity, and then causing said organic material to polymerise.

6. A process according to claim 5, wherein said steps include initially placing a first portion of the dose of organic material in the mould cavity, then placing the layer of photochromic mineral glass in the cavity and thereafter placing a second portion of the said dose of organic material in the cavity.

* * * * *